United States Patent [19]
Schulz

[11] 3,799,327
[45] Mar. 26, 1974

[54] CONVEYOR SYSTEM AND DOG

[75] Inventor: Floyd R. Schulz, 37820 Rhonswood Dr., Northville, Mich. 48167

[73] Assignee: Floyd R. Schulz Associates Inc., Northville, Mich.

[22] Filed: Dec. 7, 1971

[21] Appl. No.: 205,524

[52] U.S. Cl. ............................. 198/170, 104/172 B
[51] Int. Cl. ............................................. B65g 19/00
[58] Field of Search .................. 104/172 B; 198/170

[56] References Cited
UNITED STATES PATENTS
3,661,094   5/1972   Pachuta ......................... 104/172 B
1,742,789   1/1930   Simpson ......................... 104/172 B Primary Examiner—Evon C. Blunk
Assistant Examiner—H. S. Lane

[57] ABSTRACT

The conveyor system features plural endless and independently powered conveyor chains traveling individual guide tracks, one chain and track representing a main power conveyor line traversing the entire length of the system, and one or more further and similar chain and track-type branch lines which, at spaced zones therealong, converge and diverge in relation to the main line, paralleling the latter through some length. Thus, pusher dogs on the parallel-traveling conveyor reaches may selectively be brought into and out of propelling engagement with a given article-containing tray atop the parallel track reaches. As thus selectively impelled by only a single pusher dog on one or the other line, the tray may travel straight past a point of divergence or exit of a branch chain-track line in relation to the main line, or the tray may be mechanically switched into and out of one or more branch routes, under propulsion by a branch track dog, the power chain having been "de-dogged" from the chain at a zone of selection upstream of the diversion or exit zone. The diversion may be, for example, into and out of an elevator unit or "vertical", prior to entering which the trays are removed from the branch line, being later returned thereto for convergent re-entry to the main line. Selection of the path of tray travel is computer-controlled, and is effected through the agency of a pair of ganged mechanical tray-diverting (or returning) switch arms which pivot about axes upstream of the direction of power and branch chain travel, so that "spearing" of a tray is impossible. The ganged switch arms trip electrical limit switches at opposite extremities of the switch swing, the occurrence of which is governed by two or more movable ramp-type de-dogging units, at least one associated with each of the main and branch line tracks upstream of the diverting or exit zone. Under the control of such units dogs on the main power and branch chains are respectively left drivingly engaged with or drivingly disengaged from the trays, in effect disabling the selected pusher chain in the last named condition. Mechanical operation of the de-dogging units is in turn under the control of individual braking type electric motors intermittently operating the de-dogging ramps. These motors receive energizing signals from a read-out unit or sub-assembly under the above-mentioned master computer control; and under such governing from the read-out unit the motors operate electrical limit switches timing 180° rotations thereof in determining whether dogging or de-dogging shall take place. Read-out signals are electromagnetically received by the reader from the magnetically coded strip or plate means on the bottoms of the trays, such means thus designating the tray's destination, and being in due course re-coded for another trip of the tray through the system by write-in means similar to the read-out unit. In order to eliminate impact noise and shock upon its dogging engagement by a pusher dog traveling at considerable chain-powered speed, each tray has like front and rear walls of a semi-rigid nature, at least adjacent the bottom thereof, behind which the power chain and branch pusher dogs will engage to propel the trays; a yield of such wall portion in becoming dogged will absorb impact noises and at the same time will operate in the manner of a return spring in maintaining the dog's tray propelling contact.

13 Claims, 20 Drawing Figures

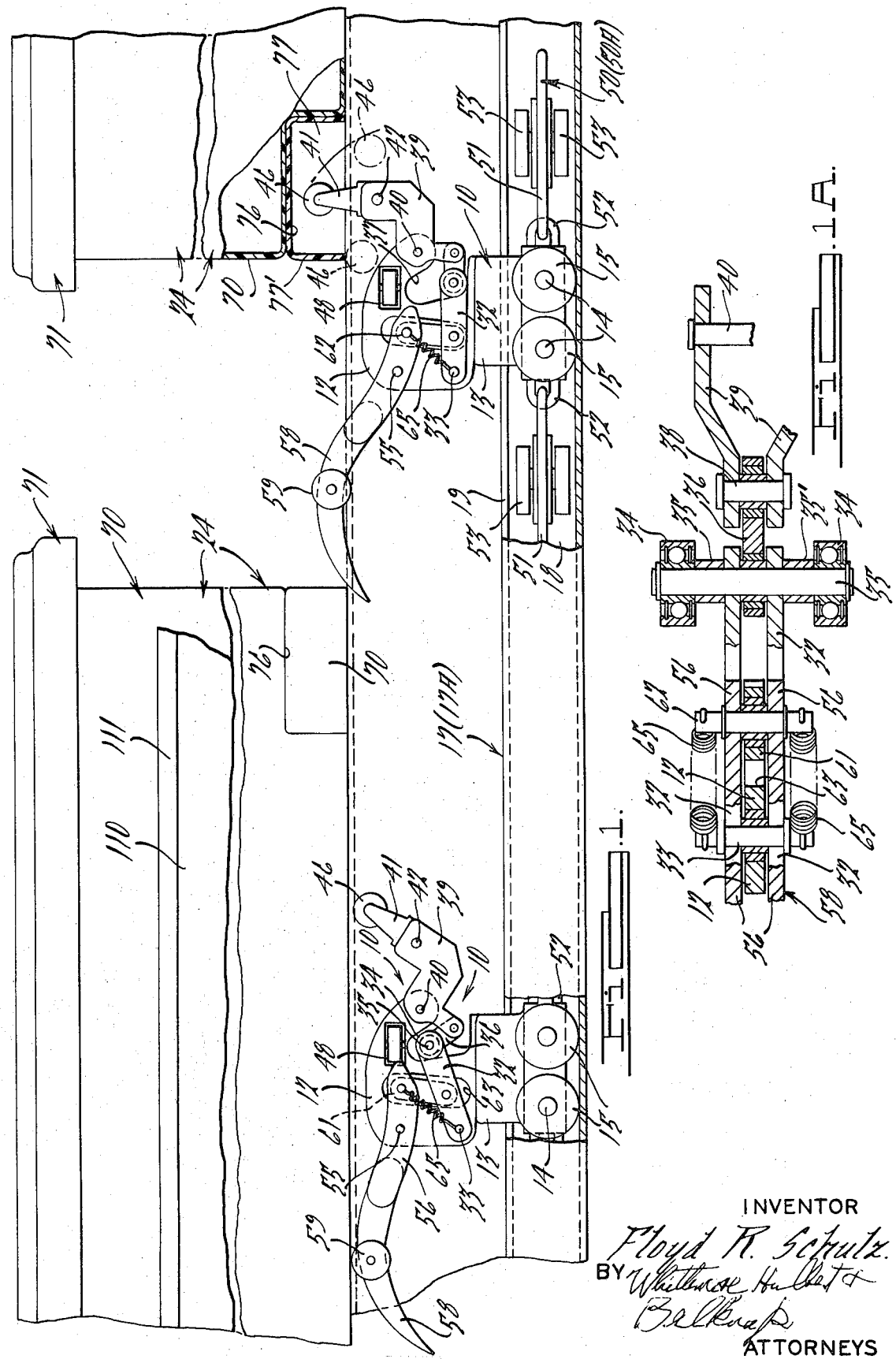

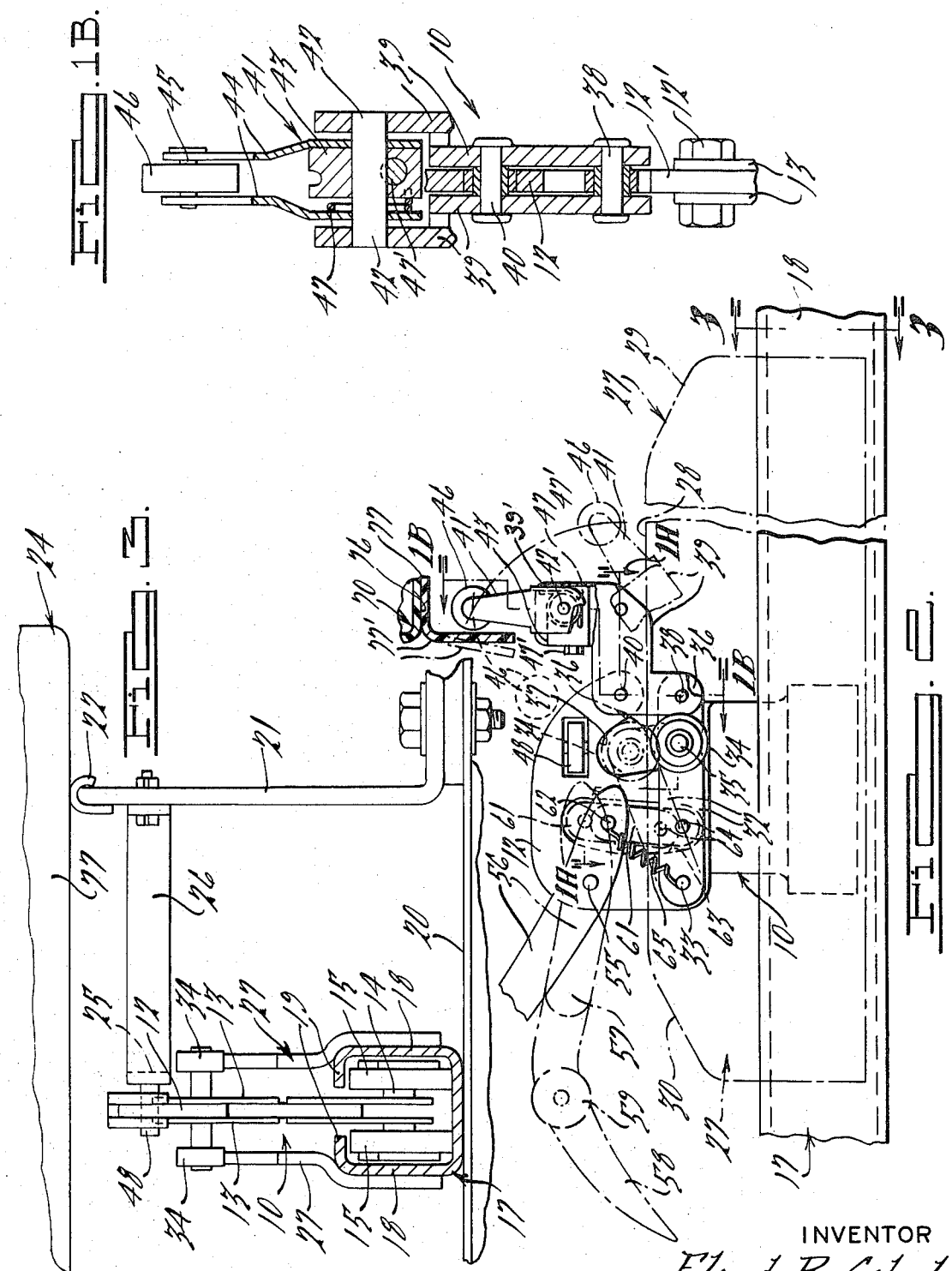

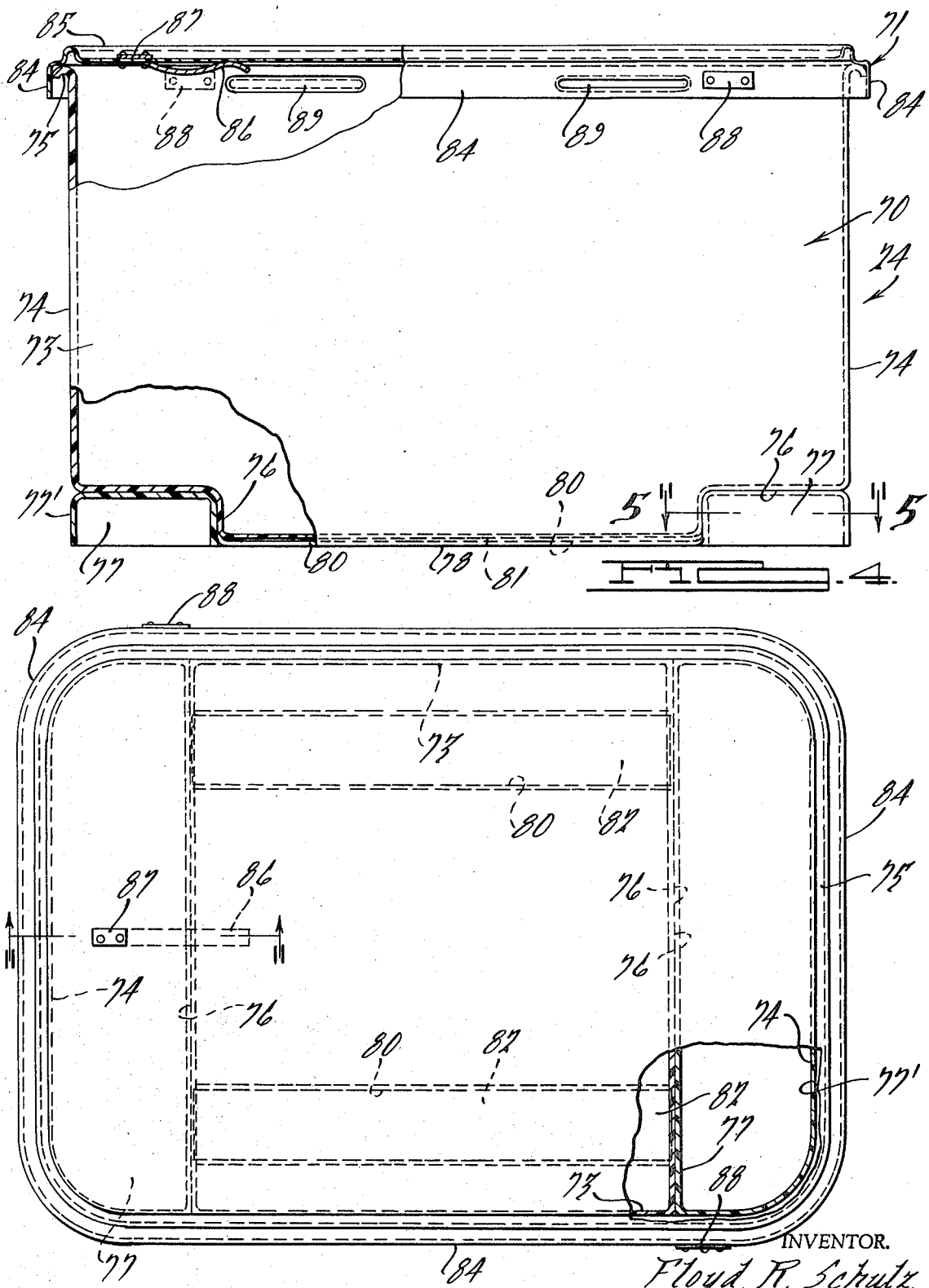

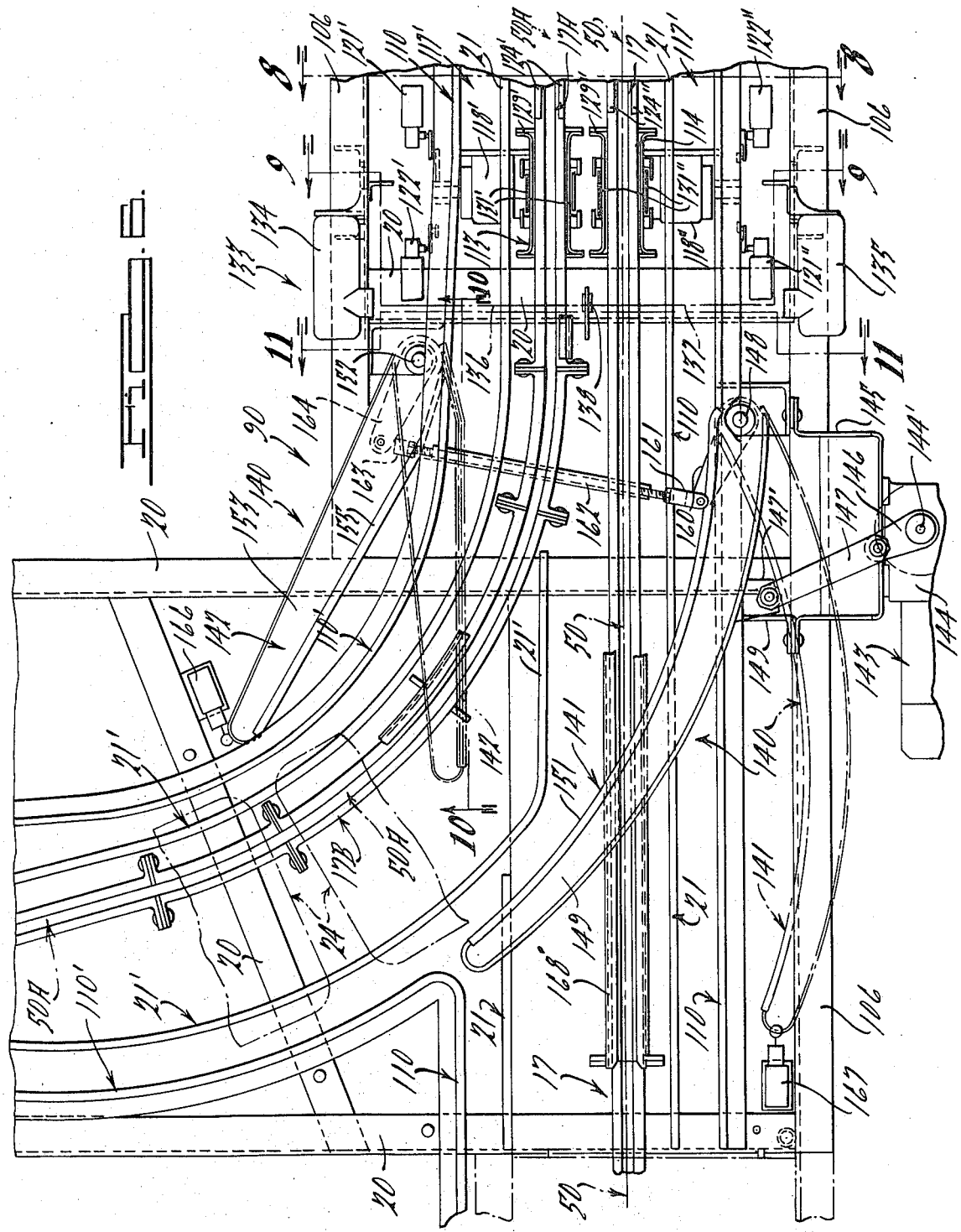

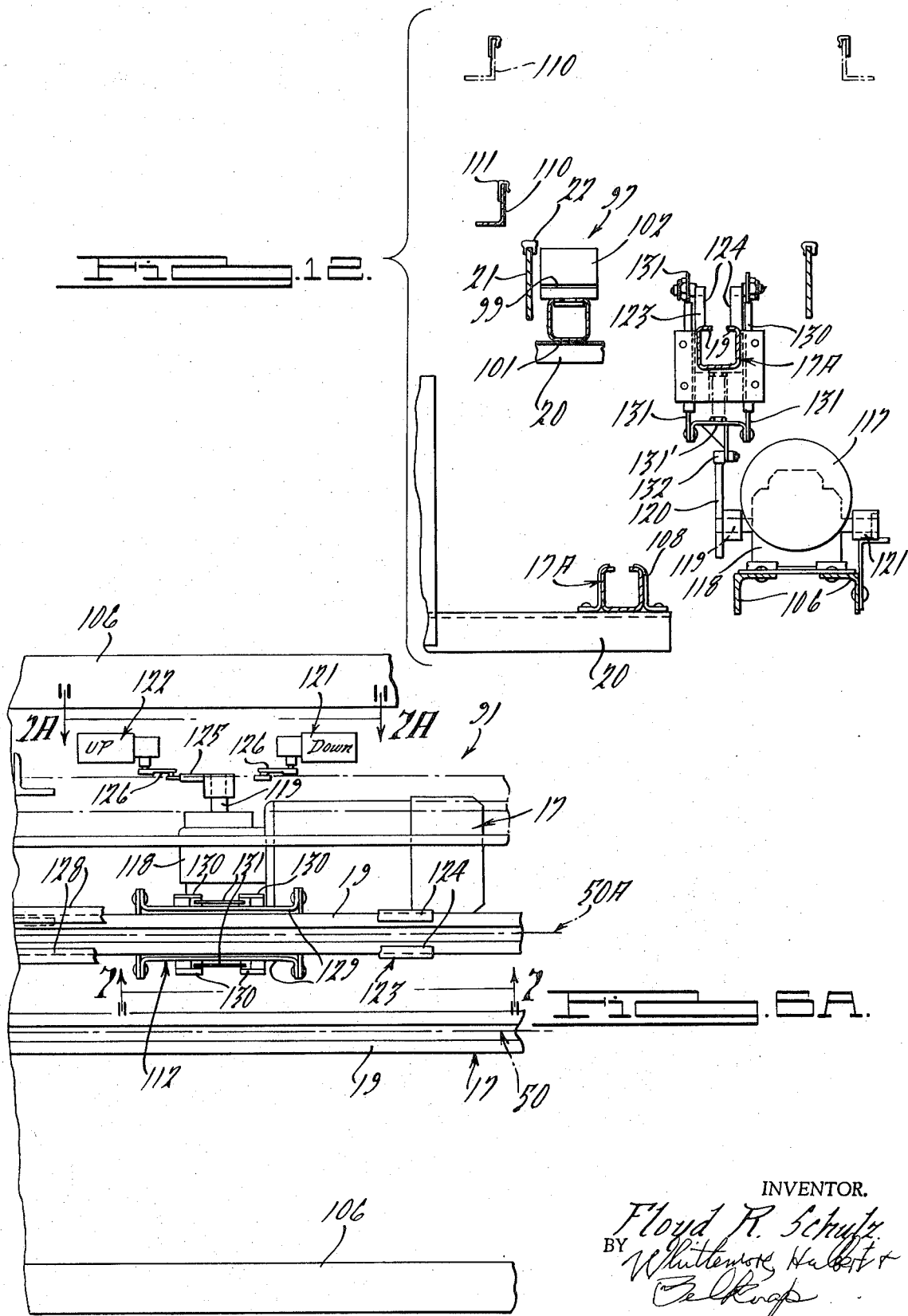

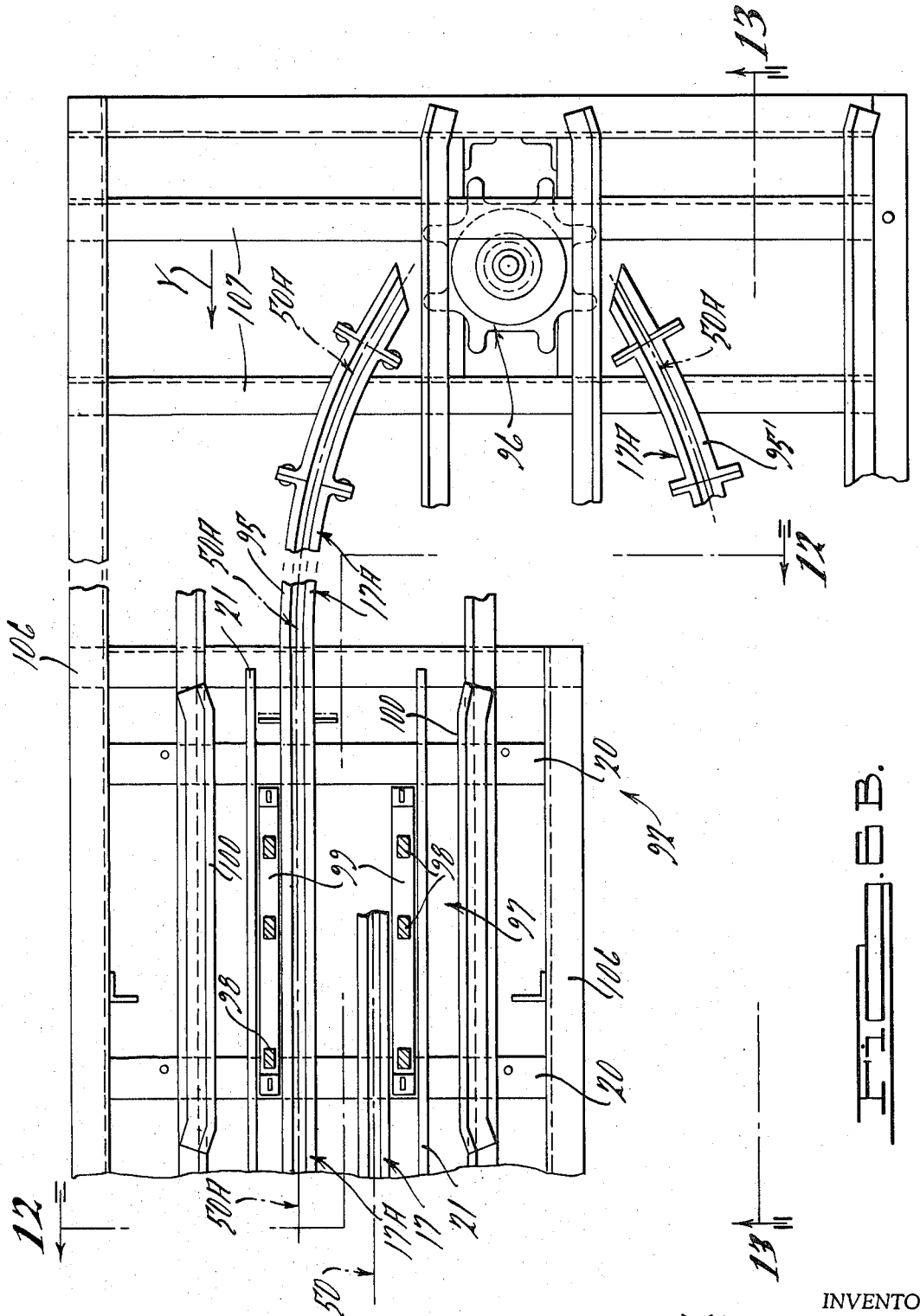

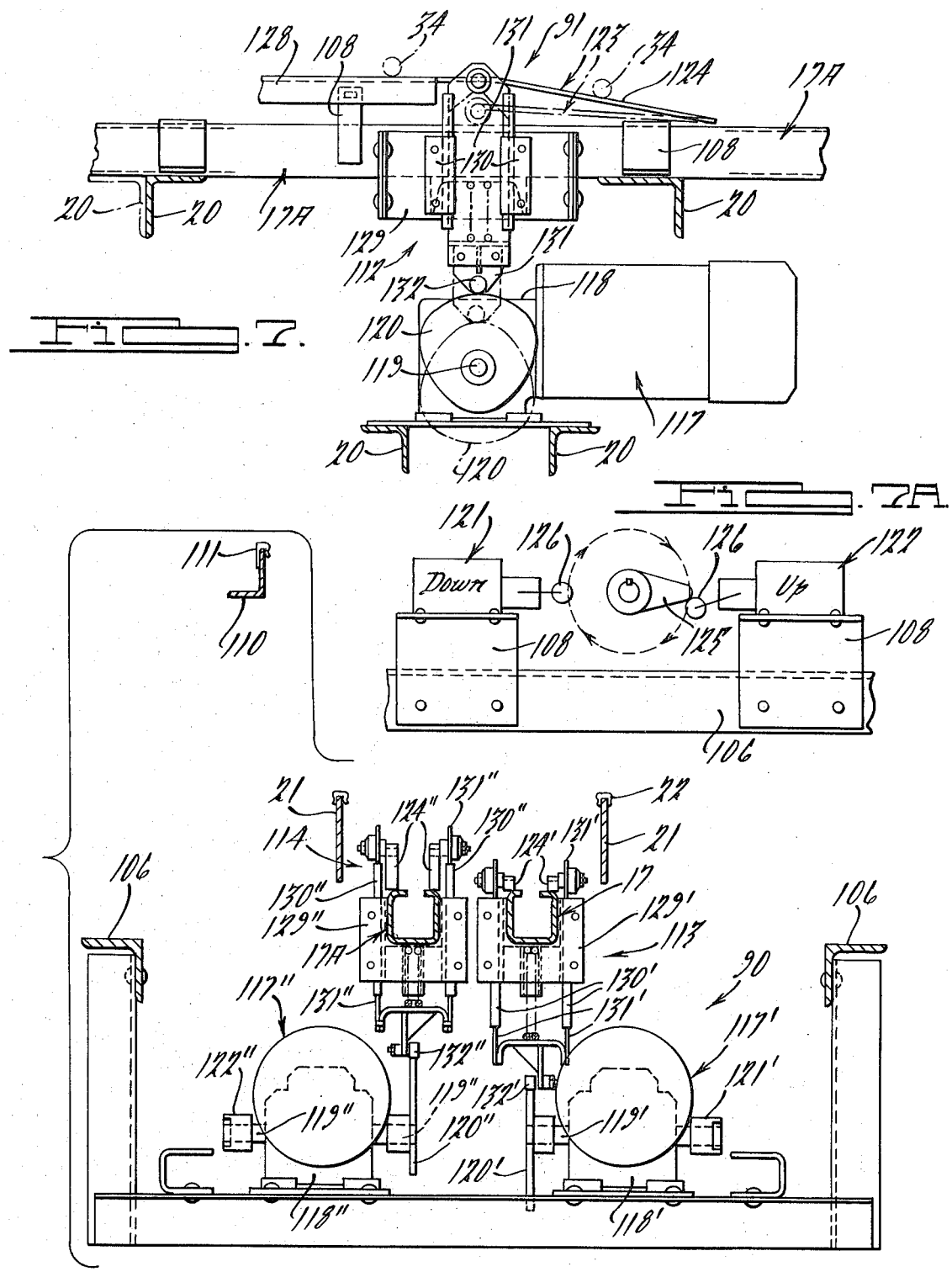

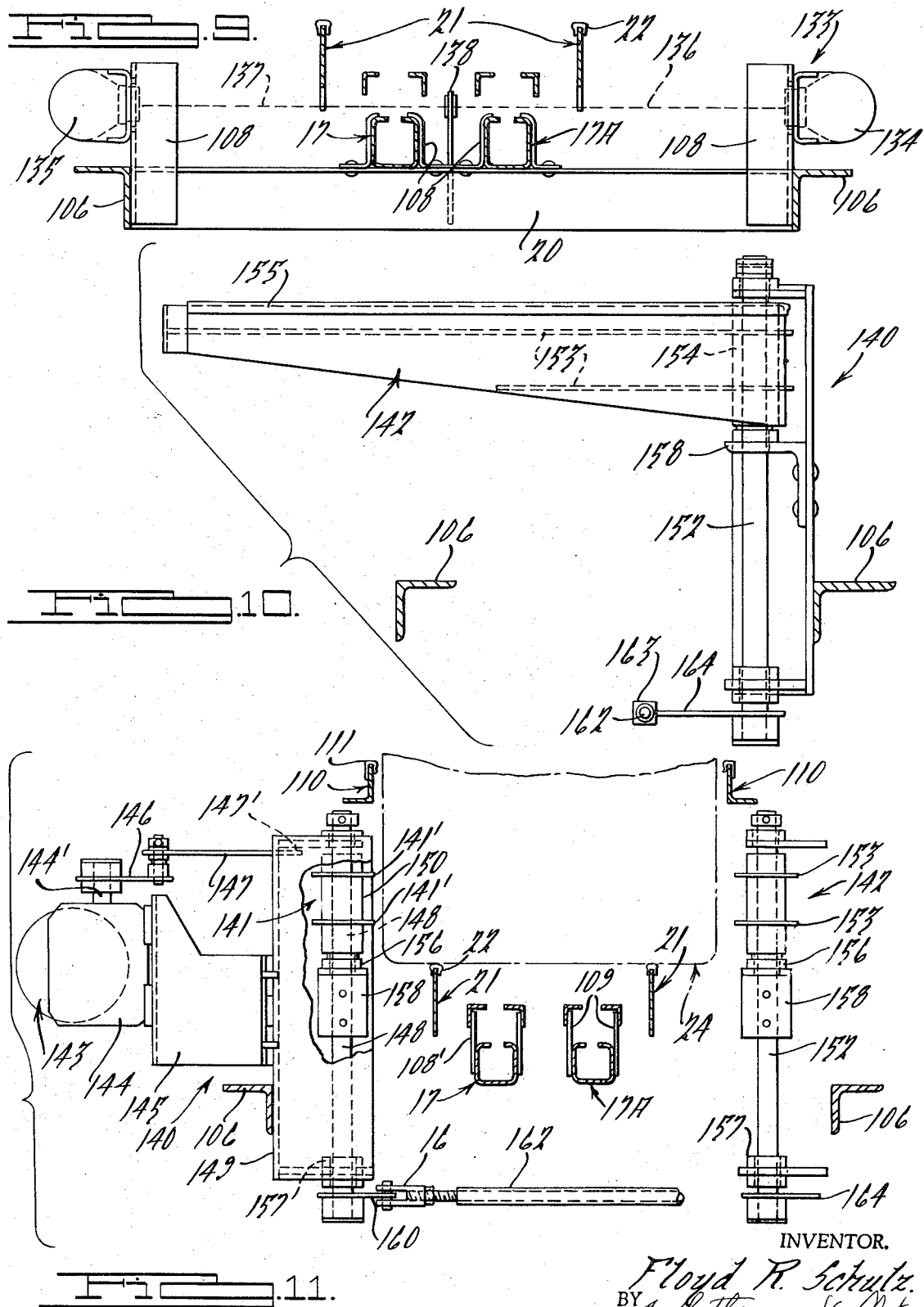

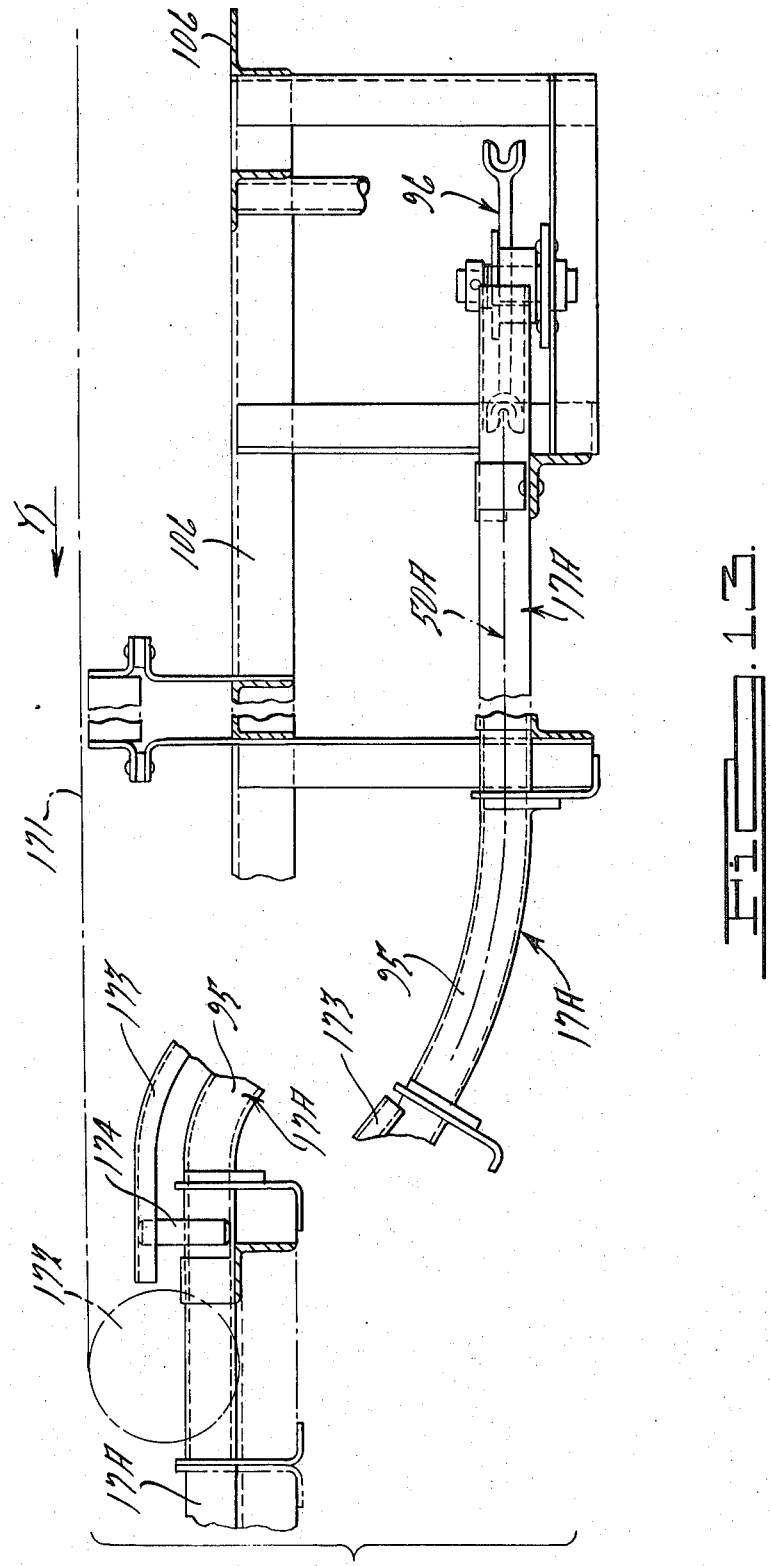

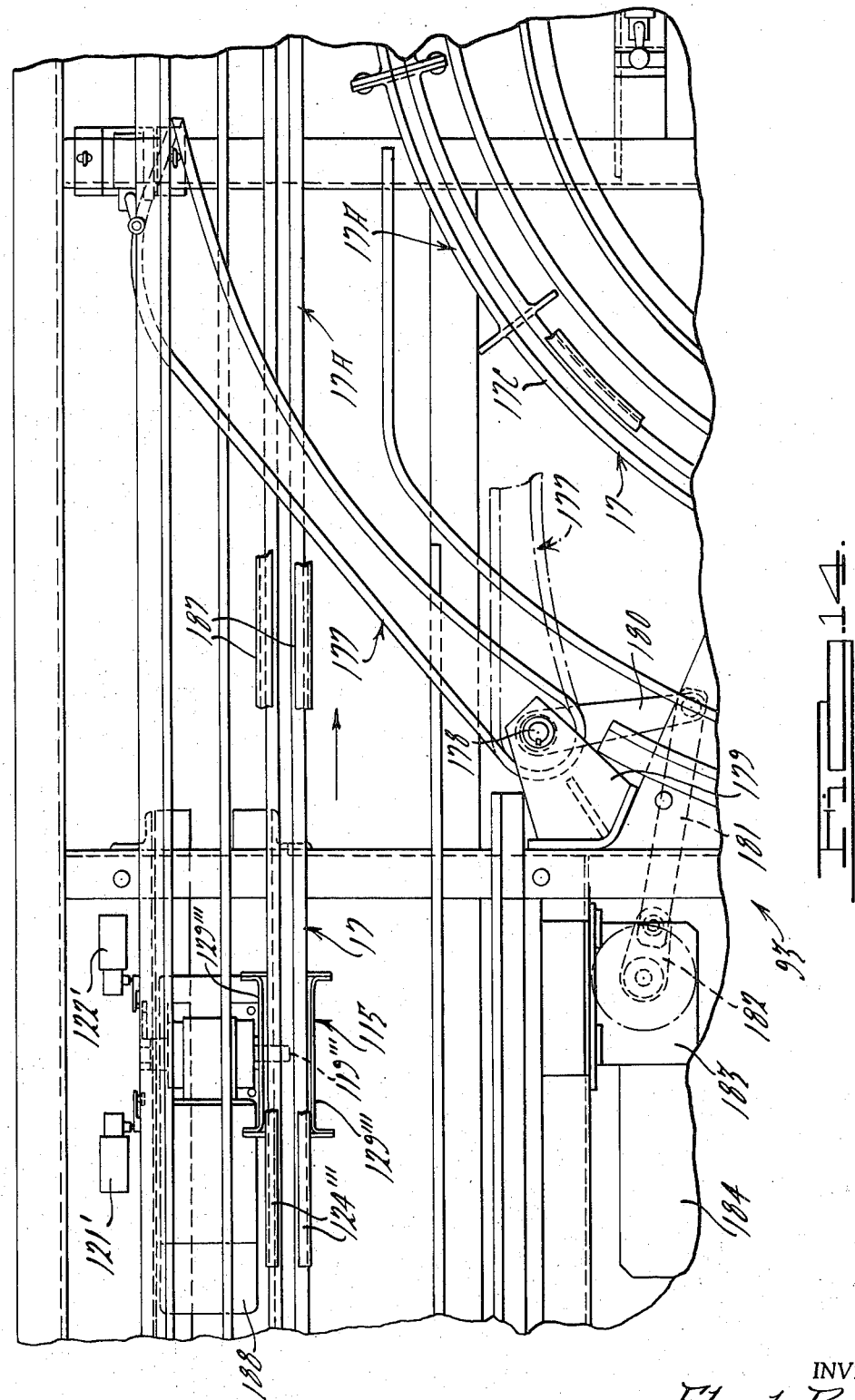

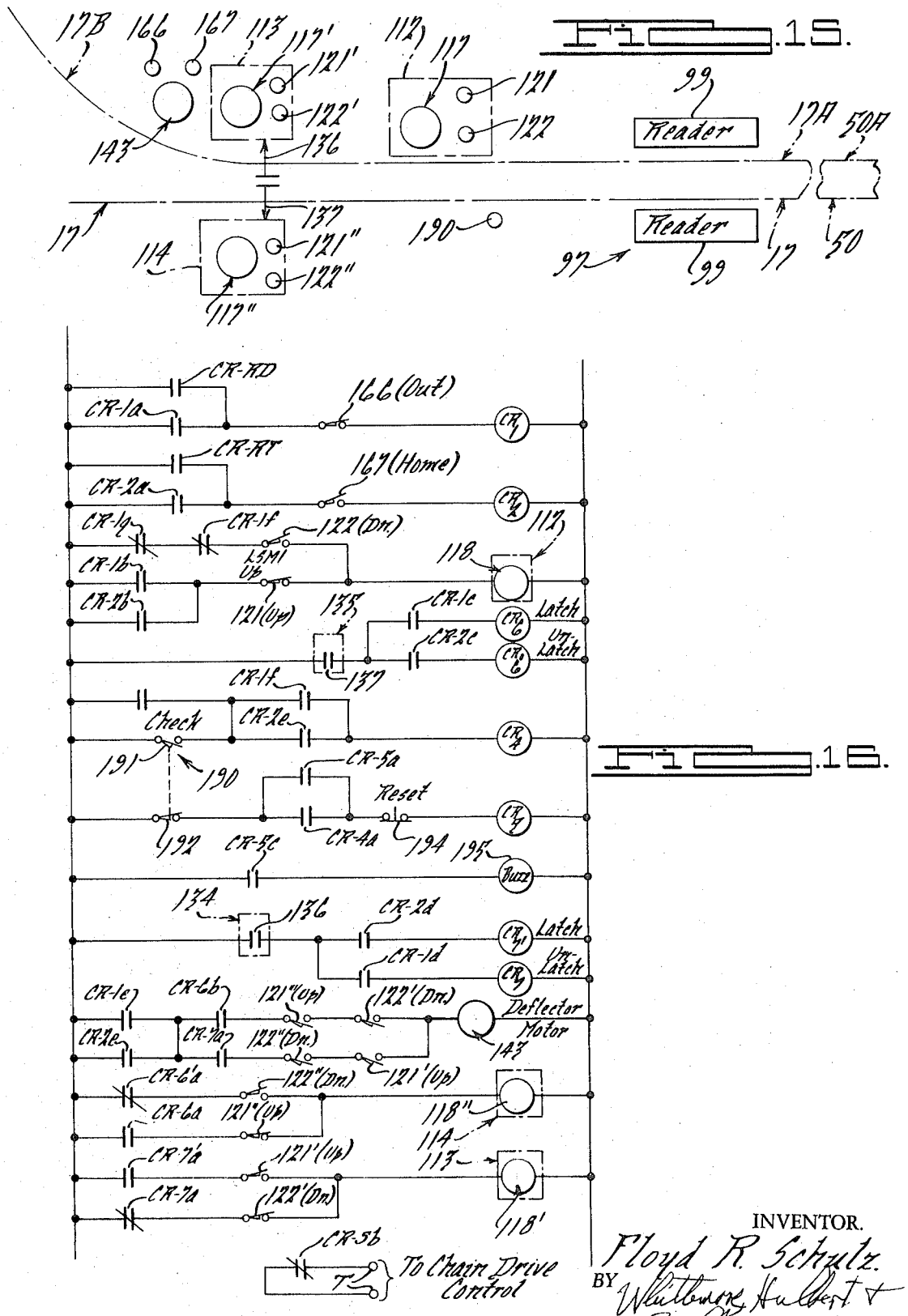

3,799,327

CONVEYOR SYSTEM AND DOG

BACKGROUND OF THE INVENTION — FIELD

The general system of the invention, also specialized and improved features of components thereof such as the load tray unit, the tray pusher dogs, the motorized de-dogging ramp unit, the gang-type mechanical tray diverter switch device and other electrical motor, limit switch and relay means governing the tray's travel direction, have been primarily devised for large scale hospital installations, in which such load trays may be power-routed to and back from any one of many destinations in multiple-floor hospital laboratory, surgical, dietary, central supply, patient operating and treatment departments, wings and the like. However, it is evident that the system and components of the invention have wider fields of application than this, for example, in industrial or commercial conveyor installations in which a full mechanical powering of the load carrying units is desired, whatever their nature may be.

SUMMARY OF THE INVENTION

As considered not necessarily in order of importance, the invention affords a combination of an improved chain-propelled pusher dog structure and an improved load carrying tray which, by reason of individual features of these respective members, contribute as a combination to a silent, substantially impact shock-free operation, as in a maintaining of the pusher dogs in a smooth driving contact with forward bottom portions of the trays. This, in particular, stems from the semi-rigid plastic wall construction of a part of the tray, which will flex and yield slightly under such local contact in a shock and noise-free manner, then restore itself to original configuration while all the time maintaining said smooth propelling contact of the tray by the dog. It has thereby been made possible to avoid recourse to a once-contemplated flexibly yieldable dog feature, which may have certain operational disadvantages.

In a preferred version, the pusher dog construction is one in which, should a dog on one or the other of the parallel main and branch conveyor line portions become halted for any reason, it will not obstruct the travel of a tray being propelled along the other line portion, thereby jamming that line. Instead, it will simply yield forwardly and permit said traveling tray to proceed substantially unimpeded.

In another aspect of the improved tray unit, it features individual front and rear transverse reinforcing members which, as adherently fused in mating recesses in the bottom of the tray body proper, in effect become integral parts of the latter, yet also afford the yieldable, dog engaged action mentioned in the second preceeding paragraph. Said members at the same time contribute a desired degree of lateral and longitudinal rigidity to the tray unit as a whole.

Furthermore, the bottom of the tray is recessed to receive magnetically codable reader strips, later read by a conventional electromagnetic read-out unit to govern by its signal the selective straight-through or branch travel of the tray, as under the control of motorized ramp, limit switch, relay, mechanical switch and other components referred to in the Abstract. The tray is normally covered by a plastic closure, which has photo-reflective plates on opposite sides thereof, enabling a special photo-tube signal to be generated to indicate if the closure cover is or is not properly in place.

As for the mechanical diversion switch arrangement of the system, it is constituted by a pair of generally parallel, rigid diverter switch arms swingable in a horizontal plane and mechanically coupled by a silent motor-operated linkage. As thus ganged, the arms move as a unit in diverting a tray onto a branch exit line portion; there is a positive control of both sides of the tray in this action.

Likewise, the switch arms referred to are pivotally mounted for swing on axes rearward of free ends thereof, i.e., in the direction of their length upstream or opposite of the direction of tray's diverted exit travel. There is no possibility of a tray being "speared" in the unlikely event of a misfunctioning or mis-timing of the swing of the ganged arms of the mechanical switch structure.

Considering the system as a whole, it is predominantly a braked motor-powered one, in regard to a co-ordinated limit switch-phased actuation of the de-dogging ramp units thereof and the mechanical diverting switch structure, hence silent in its operation. There are no clacking solenoid operators, electrical relays or other operationally noisy components in these relatively exposed controls, it being observed that multiple electrical relay units appearing in the wiring diagram of FIG. 16 will, of course, be housed in a suitable console remote from the actual hospital zone through which the conveyor passes. Incidentally, this will normally be in an above-ceiling ventilation space or plenum also accommodating fluid or electrical conduitry. Otherwise, the system will be substantially automatic in its operation, requiring little or no supervision or maintenance, being computer controlled in a fail-safe fashion and incorporating simple, compact solid state components.

BRIEF DESCRIPTION OF THE DRAWINGS

FIG. 1 is a fragmentary and more or less schematic view in side elevation of chain-powered pusher dog arrangements to propel successive load tray units, being partially broken away and in vertical longitudinal section, the view showing a pair of successive tray pusher dog units (respectively at left and right) in a disabled or de-dogged condition of one unit, as it fails to engage and travels beneath the bottom of one tray, and dogged condition of the other unit as it approaches an operative pushing relation of the other tray, and just prior to being automatically de-dogged in its turn by the first tray for accumulation behind the latter;

FIGS. 1A and 1B are, respectively, fragmentary views in horizontal and vertical cross-section on broken lines 1A—1A and 1B—1B of FIG. 1, showing structural details of the dog unit;

FIG. 2 is a fragmentary view in elevation similar to FIG. 1, but somewhat larger scale, more clearly illustrating the operation of un-dogging a pusher unit, as operated, for example, by a fixed track cam device appearing solely for reference in dot-dash line (although the same action takes place in the case of motorized movable ramp control) — a pusher dog arm being shown in solid line in what would be an operative dogged position (in the absence of the cam device); in dot-dash line in a de-dogged, disabled condition in which it would be if the unit were operated by the fixed cam device; and in dotted line in the forwardly knockedover position the arm would take if struck from behind by a tray traveling a parallel track portion;

FIG. 3 is a fragmentary, quite schematic view in vertical transverse section on line 3—3 of FIG. 2;

FIG. 4 is a side elevational view, as partially broken away and in vertical section on a line corresponding to line 4—4 of FIG. 5, of an improved type of covered tray assembly contemplated for use in the conveyor system of the invention;

FIG. 5 is a top plan view of the tray unit as partially broken away and horizontally sectioned on line 5—5 of FIG. 4;

FIG. 6, 6A and 6B represent a series of fragmentary top plan views showing the general assembly of power chain (dot-dash line) and track, motor operated switch, de-dogging control ramp, limit switch and magnetic reader features of the system;

FIG. 7 is a fragmentary view in vertical longitudinal section on line 7—7 of FIG. 6A, somewhat schematically showing one of several similar motor power and cam operated de-dogging ramp units of the invention, as herein described, pusher dog conveyor chains again being indicated in dot-dash line;

FIG. 7A is a view similar to FIG. 7, but on line 7A—7A of FIG. 6A, illustrating a motor-operated limit switch arrangement for the timed operation of said ramp unit, FIGS. 7 and 7A being typical of other such arrangements;

FIG. 8 is a view in transverse vertical section on line 8—8 of FIG. 6, showing downstream main and branch line ramp units similar to that of FIGS. 6A, 7 and 7A, which are also limit-switch and relay coupled with tray-diverting switch means appearing in FIG. 6, and coact with the upstream ramp control unit in a coordinated fashion;

FIG. 9 is a view in transverse vertical section on line 9—9 of FIG. 6, illustrating features of a reflective photo-electric switch device wired in the circuitry of the system, and incorporating a pair of electric eye components responsive to the travel of pusher dogs along the respective main and branch tracks;

FIG. 10 is a view sectioned vertically and longitudinally on line 10—10 of FIG. 6 to show structural features of one of two ganged pivoted tray diverting mechanical exit switch arms;

FIG. 11 is a view in transverse vertical section, as along broken line 11—11 of FIG. 6, showing further operational features of the mechanical diverter arm device;

FIG. 12 is a view in transverse and vertical section on a line corresponding to broken line 12—12 of FIG. 6B, indicating certain features of the standard read-out sub-assembly or unit associated with the conveyor system;

FIG. 13 is a fragmentary view, broken away and in longitudinal vertical section as viewed on line 13—13 of FIG. 6B, illustrating a structural track rise and fixed ramp feature of the pusher dog power chain track structure, by which, for example, a dog is automatically disabled or de-dogged pending a proper return of a tray unit from a branch auxiliary station or vertical to position for a resumption of its chain-powered travel along the main or branch track;

FIG. 14 is a fragmentary top plan view of a typical tray re-entry or convergent switch assembly of the system, as governed by still another limit switch-controlled, motor operated de-dogging ramp sub-assembly similar to those appearing in FIGS. 6, 6A, 7 and 8;

FIG. 15 is a highly schematic layout of the read-out unit, electrical motor-driven ramp units, their switch arm controls and like equipment, as typically associated with an exit zone of the system, corresponding to mechanisms shown in FIGS. 6, 6A and 6B; and FIG. 16 is a schematic wiring diagram for the portion of the system referred to in the preceding paragraph.

DESCRIPTION OF A PREFERRED EMBODIMENT

The improved conveyor dog units of the invention, as generally designated by the reference numeral 10 and best shown in FIGS. 1, 1A, 1B and 2, are continuously propelled about the length of the system (components of which in the form of mechanical switch means and electrical controls are hereinafter described) under propulsion by one or the other of two types of individually powered, endless chain type conveyor organizations of the sort mentioned in the Abstract; each dog unit being mounted to the drive chain of such organization through the agency of a base or body structure similar in a general way to the type of trolley 11 commonly used in industrial power and free conveyor systems. In general, such trolley comprises, as perhaps best illustrated in FIGS. 1A and 1B, an upright plate 12 fixedly mounted, as by bolts 12' adjacent its lower edge, to a pair of further parallel plates 13 which mount transverse axles 14 of pairs of trolley rollers 15. These run in the interior of a generally U-shaped track components of the system, of which components that of the main power line is numbered 17 and that of the branch line is denoted 17A. Upright walls 18 of these tracks are inwardly flanged at 19 to exert downward restraining action on rollers 15; and the tracks will ordinarily be rigidly supported, in a hospital installation presently contemplated by the invention, on cross angle members 20 in an elevated enclosure structure, which may well be represented by an upper plenum structure for ventilation, to receive utility electrical conduitry, liquid lines, etc., FIG. 3 shows a special feature of this arrangement in a pair of upright and elongated, parallel tray-supporting ways 21 (only one appearing in FIG. 3), each capped along its top by a plastic anti-friction plastic slide member 22. It is upon these that the trays of the invention, as generally designated by reference numeral 24, slide when propelled by a dog structure 10. Side guide tracks 25 for the pusher dogs 12, as mounted by brackets 26 to a way 21, may be provided to afford lateral support for the dogs, particularly in rounding a bend in a track 17 or 17A.

Also, at one or more points along the length of the conveyor system, the tracks 17 and/or 17A may fixedly support a pair of like, upwardly extending and fixed de-dogging actuator cam plates 27, as welded or otherwise fixedly secured on opposite side walls of the track. These plates are intended to provide a de-dogging release of dog units 10 on the chain at any desired point in the system, for example, when a non-propelling travel of the pushers is in order over a substantial distance before restoration to power pushing, in traversing a fire wall opening, in crossing another chain track and the like.

To this end (though details may of course vary) each plate 27 is characterized by flat horizontal upper edge 28 merging at its rear end into a downwardly inclined entry de-dogging cam surface 29, and at its opposite forward end into a downwardly inclined re-dogging cam surface 30.

In this connection it is to be borne in mind that the showing of FIG. 3, as it relates to features of the pusher dog unit 10, is strictly schematic. FIGS. 1, 1A, 1B and 2 control in reference to such features.

Thus, whether for coaction with a fixed de-dogger such as plate unit 27 or for similar action in response to a movable ramp-like control unit (to be described), the dog plate 12 has a pair of operating arms 32 pivotally mounted on its sides at a forward pin 33; and arms 32 extend rearwardly to an end at which a pair of ball bearing-equipped cam or ramp-engaging control or operating rollers 34 are journalled (FIG. 1A), as at opposite ends of a fixed journal pin 35, with spacers 35' intervening. It is these rollers 34 which are adapted to engage and ride upwardly, along and down the edges 29, 28, 30 of the cams 27, or of the parallel rails of movable ramp devices to be described. The arms 32, in addition to their function as carriers for the cam follower rollers by which the same are confined to substantially up and down motion, serve as one link of a toggle connection.

The toggle connection also comprises a relatively short connector link 36 that has one end pivotally mounted, with intervening bushing means, at the roller journal pin 35, the pin and link normally acting within a bottom and rear recess 37 of the dog trolley plate 12; and link 36 extends between and is pivotally mounted, as by a pin 38, to a pair of like operated plates 39 that cooperate to define a pusher lever member of generally Z-outline in elevation, per FIGS. 1 and 2. These plates diverge from, then parallel one another, and near their lower ends they are pivotally mounted by a pin 40 on opposite sides of upper pusher dog plate 12, just rearwardly of recess 37 of the latter. The short link 36 is connected to a lower arm of the lever comprising plates 39.

Referring to FIG. 1B in conjunction with FIGS. 1A and 2, plates 39 serve as a support for a pusher dog arm 41 pivoted therebetween, on the upper arm of the lever comprised of plates 39. The pusher dog arm is swingable on a transverse journal shaft 42 extending through a block-like lower body member portion 43 which is secured to plates 39, between them, the ends of this shaft being secured in apertures in spread extremities of the plates. Arm 41 is of U-shaped horizontal cross-section in the area of journal shaft 42; and upper extensions 44 of said arm, as journalled on shaft 41, pivotally mount therebetween, on a transverse journal pin 45, an anti-friction tray pusher roller 46. Provision is made to sustain the pusher arm 41 against clockwise rotation (FIGS. 1 and 2) on its trunnions at 42 beyond the upright tray-propelling position (solid line in FIG. 2), while still permitting a momentary yielding forward tilt of arm 41, along with the roller 46, to the dotted line position.

This yieldability will, in the event a pusher unit's chain becomes intentionally or unintentionally halted, enable, nevertheless, a pusher-propelled tray 24 on the other parallel track reach to pass by substantially unimpeded. For the intended purpose the pusher arm member 41, as anti-clockwise back-stopped at its extensions 44 by a transverse member 39' fixed to and extending between the plates 39, is biased clockwise by spring 47 surrounding its journal pin 42. A lock stud 47 received in a hole in body block 43 has an upwardly opening arcuate seat straddling shaft 42 to hold the block fixed to said shaft, hence in fixed relation to plates 39; and as appears in FIG. 1B, one end of spring 47' anchors in block 43, the other spring end reacting against the cross part of U-section arm 41 (FIG. 2).

As a desirable option, the main upright plate 12 of dig unit 10 may mount a vertically journalled anti-friction roller 48 (see also FIG. 3) adapted to roll against the side guide track or way 25 of the mounting framework.

FIG. 1 shows the above described trolley pusher dog structure 10, as guided and traveling in the track 17, to be flexibly connected to other like dogs 10 at equal longitudinal spacing of, say, five feet from one another, by an endless main track power chain, generally designated 50, whose elongated links 51 articulate with bail members 52 at the fore and aft parts of the dog unit, being equipped with anti-friction roller means 53 guided between the upright walls 18 of track 17. A similar but independent pusher dog chain 50A will propel trays 24 along the branch track 17A. Thus, in operation the dog's pusher arm member 41 and roller 46 will, as appears at the right and in solid line in FIG. 1, normally be substantially upright to engage in a bottom forward recess of a tray 24 (structure of which that provides such recess being later described in detail). As the actuating arm roller 34 of the dog rides onto a cam or ramp formation, such as is represented in the former case at cams 27 in FIG. 2, the pusher lever comprising plates 39 is caused to swing clockwise downwardly to the rear about the basic dog arm axis at 40, as indicated in dotted line in FIG. 1, out of tray-driving position, this against the bias of basic coil spring means of the dog unit 10 which will be described. By reference to the trolley units illustrated in two different conditions in FIG. 1 it will be seen that the toggle connection comprising the links 32 and 36, in their connections to one another and to the trolley plate 12 and the pusher lever member comprised of the plates 39, releasably lock said lever in its operative position in which the pusher dog arm 41 can have propelling engagement with a tray. That condition is illustrated in the right hand unit in FIG. 1, in which the normal toggle-locked condition is defined by cooperation of the toggle linkage with the bottom of the recess 37 in the trolley plate 12. Raising the cam follower rollers 34 of course "breaks" the toggle and swings the pusher lever out of its operative position, as illustrated by the left hand unit in FIG. 1. The same de-dogging action is also automatically the result of an accumulating engagement of one dog unit with a halted tray 24 previously advanced along the same track 17 or 17A by a just proceeding and now disabled dog structure. Such accumulation de-dogging is provided for by means of a sensing member now to be described.

Thus, in accordance with the invention (and as best shown in FIGS. 1A and 2) mounting plate 12 of each dog unit 10 pivotally supports at opposite sides and adjacent the forward edge thereof, as by means of a pivot pin 55, a pair of like parallel, forwardly elongated and mildly arcuate de-dogging tongues 56. These are laterally offset at 57 to unite in a single, preferably integral tongue extension 58 transversely central of the dog unit 10 and its drive chain. As is evident from FIG. 1, the tongue extension 58 has its upper surface inclined forwardly and downwardly for camming cooperation with an overtaken tray whereby the tongue is depressed to clear the tray. Tongue 58 is preferably equipped with anti-friction rollers 59 on either side thereof to avoid or minimize marking of the bottom of a tray 24 as the tongue mildly impacts and passes beneath the tray, automatically effecting de-dogging therefrom.

Rearwardly of its pusher plate pivot point at 55, the tongue arms members 56 have a relatively short upright link 61 pivotally connected therebetween, as by a bushed pin 62, the link and pin being accommodated for movement in a vertically elongated opening 63 in dog unit plate 12; and the lower end of link 61 is pivotally connected by another pin 64 between the operator or control arms 32 of the dog unit 10. It will be evident that the link 61 provides a motion transmitting connection between the sensing member and the toggle connection comprising links 32 and 36, which connection causes the togle to be unlocked when the sensing member is cammed down by an overtaken tray; and through the links 61, 32 and 36 such downward camming of the sensing member causes the pusher lever to be swung out of its operative position about its pivot 40.

Coil tension springs 65 connect between the tongue-to-link pivot pin 62 and the pivot pin 33 of operating control arms 32, and serve to urge the tongue member 58 continuously clockwise about its pivot pin 55, i.e., to the position shown for the right-hand pusher unit 10 appearing as shown in FIG. 1. This necessarily also continuously biases link 61 downwardly and, through the pin connection of link 61 to operating arms 32 at 64, biases said arms clockwise about their dog plate pivot pin 33. Consequently, the pusher dog arms 39 and 41, along with the roller 46 of the latter are, through pivotal linkage connections previously described, biased to the operative, tray-propelling position appearing at the right of FIG. 1.

Prior to further description of the conveyor system and the directional control of travel of the above-detailed conveyor dog units 10 a discussion of the structural features of the improved tray unit 24 is in order, as best illustrated in FIGS. 4 and 5.

The unit is a two-piece one as to both of its body and cover components 70, 71, respectively, being preferably molded of an appropriate synthetic plastic composition which is relatively rigid and will withstand, without warping, distortion and the like, a normal working temperature ranging as widely as 0° F. – 190° F. A product marketed by General Electric Co. under the trade name "Noryl" has been found suitable for this kind of performance.

As for the tray body 70, it is of elongated rectangular outline in plan, and is deeply drawn in vertical section as appears in FIG. 4. The upper edges of its integrally molded side and end walls 73, 74 are formed as outwardly and downwardly rounded beads 75; and bottom end recesses 76 are molded to extend transversely parallel across forward and rear ends of the tray body. The recessing is identical at each end, so that the tray unit 24 may be propelled identically in either direction of travel. Recesses 76 matingly receive inverted box-like, downwardly opening reinforcing shoes 77, which are rigidly secured, as by fusion, to the tops and ends of the correspondingly contoured recesses 76, being shaped to come flush with the side and end walls 73, 74 and the tray bottom 78.

Elongated parallel recesses or depressions 80 are molded in the bottom 78 in the longitudinal zone between its recesses 76, being located in inwardly spaced relation to the tray body side walls 73 (FIG. 5) and extending from end to end of the bottom cross-recesses. These depressions 80 may receive correspondingly shaped, fused reinforcing plates 81; however, their main purpose is to receive a pair of like magnetically codable sensing plates 82. These will receive electromagnetically coded write-in data, as, for example, at five equally spaced sub-areas along the length of each plate 82; such data are read off by certain conventional reader equipment of the conveyor system (later described) in determining a precise destination to which the tray unit 24 is to be forwarded, as many as 60 termini being contemplated.

The tray cover 71 is molded in a considerably lesser thickness than that of body 70; and it is preferably transparent for viewing of the latter's content by an attendant; yet it should have the same degree of thermal stability as the body. Cover 71 is marginally flanged downwardly 90° at 84 about its perimeter for a snug fit over the tray beading 75; and is also ribbed upwardly at 85 at a short distance inwardly of its periphery for additional rigidity.

At one end thereof an appropriate stainless steel spring clip 86 is appropriately bolted or riveted at 87 to the lower side of and centrally of cover 71, which clip will securely but removably hold a suitable computer data card identifying its content, if this is desired. Additionally, the cover flange 84 carries at at least one side of the cover a fixed photo-reflective plate 88, which may be used to enable an appropriate photo-sensing unit or device of the system (not shown) to determine automatically whether or not the cover 71 is in place on tray body 70, as it should be. Finally, cover 71 is molded at its opposite sides to afford elongated lifting hand holds 89.

The conveyor system, in its best form contemplated by the invention, may be considered to be constituted, just upstream of and up to a tray diverting or exit area thereof, of three closely coordinated sub-assembly zones which, by reason of drawing limitations, have been separately illustrated in the top plan views of FIGS. 6, 6A and 6B. However, it must be kept in mind that these zones are but continuation portions of the system in the longitudinal sense of the direction of travel of the dog-forwarded tray units 24.

Thus, the structure of FIG. 6 may be considered to represent a mechanical tray diversion or switch zone 90, at which the direction of travel, in relation to a straight line continuation of main power track 17 and a switch-controlled diversion from that direction onto an arcuate continuation of the parallel branch power track 17A, as specially designated 17B in FIG. 6, is selectively effected; an intermediate zone 91 (FIG. 6A) upstream of zone 90, which is closely coupled operationally by limit switch and motor controlled ramp means with the mechanical switch means in zone 90; and a zone 92 (FIG. 6B) still further to the rear (or upstream of zone 91), which is a read-out zone, at which electrical signals originate (as taken, for example, from electro-magnetically coded impressions or invisible indicia on the plates 82 of the tray bodies 24) and are forwarded to the motorized ramp units of the equipment - zones 90, 91 of the system, as well as to electrical limit switch-controlled motor means which operates in one direction or another the mechanical tray diverter means in zone 90. On the other hand, the zone 93 depicted in FIG. 14 is a zone of convergent re-entry of trays 24 into the main track power system proper, being equipped with protective ramp de-dogging means of the same type used at the combined zones 90, 91 and 92 governing optional tray exit.

The tracks 17 and 17A for the chain-powered pusher dog units 10 are contoured in plan and side elevation, as appears respectively in FIGS. 6B and 13, to rise gradually and curve, in a compoundly arcuate section 95 thereof, from a lower level on which they guide the respective power chains 50, 50A about a vertically journalled sprocket 96 up to the main horizontal level of the system, along which the tracks 17, 17A extend parallel to one another and the chains travel for a major longitudinal distance, as indicated in the combined FIGS. 6, 6A and 6B.

But a single sprocket 96 has been shown in FIGS. 6B and 13, serving to guide the branch line power chain 50A; however, it is to be understood that another similar and appropriately proportioned sprocket will similarly guide the main line power chain in a track rise corresponding to the rise 95. Of course, track drops 95' to the level of the sprockets, as shown in FIG. 6B, will be present.

Suitably rated motor means are provided to drive the power chains 50, 5A independently of one another continuously, such means being capable of direct application to sprocket 96 or any one of other vertically journaled sprockets (not shown) about which the chains 17, 17A are trained in the usual fashion of conveyor systems. Chain power may be halted automatically under the control of relay means schematically shown in FIG. 16 and later described.

At the elevated lever thereof, the tracks 17, 17A longitudinally traverse a reader unit or sub-assembly (FIGS. 6B and 12), generally designated by the reference numeral 97, prior to which the tray units 24 have been electromagnetically coded selectively, optionally on one or both of their bottom plates 82, as schematically indicated by small hatched areas 98 on read-out plates 99 of unit 97. In being fed to said unit the trays 24 are located between parallel flare-ended side guides 100 appropriately supported on horizontal frame structure, as by tubular members 101 carried by frame angle irons 20, and are supported by the plastic-capped parallel support ways 21. The read-out assembly 97 (which includes an upright stop 102) is entirely conventional in nature and available on the market; it proceeds to originate an electrical signal from pre-coding 98 on its component reader strips 99. Thus, any one or group of the sensor areas will forward a signal for the mororized control of the mechanical ramp and switch means hereinafter described. Under such control a tray unit 24 spanning parallel tracks 17 and 17A will either follow an undiverted rectilinear path for a considerable distance as powered by main line chain 50, or will be angularly diverted 90° from that path, as powered by branch line chain 50A. An undiverted tray will ordinarily go into a switch zone further downstream from which it will be switched onto an arcuate line corresponding to line 17B.

In general, the frame structure is made up of various types of angle iron or channel pieces like the angles 20, brackets, hangers and the like, all in well known use in conveyor systems. For example, the framework will consist of elongated parallel angle irons 106 between which the cross-angles 20 are welded, and other similar longitudinal pieces. These details not being germane to the invention, the further description thereof is deemed unnecessary.

Typically, the power chain tracks 17 and 17A will be held in place on the cross frame members by riveted restraint clips 108, as appears in FIG. 9; and in some instances, depending track support straps 108' are employed, as shown in FIG. 11, these being weld-suspended from small longitudinal frame pieces. Parallel upright side guide rails 110 equipped with anti-friction top caps 111 are mounted on the frame structure to guide the sides of the tray units 24 in travel; and these rails are preferably made vertically adjustable, as indicated in dot-dash line in FIG. 12, to accomodate trays of different heights.

Referring to FIGS. 6A, 7 and 12, the track 17, on the side thereof to the left of the read-out unit 97, is equipped with a first movable ramp-type dogging and de-dogging control unit which is generally designated by the reference numeral 112. Although designated as being movable, it is fixed in one or the other of two movably adjusted positions thereof; and it is structurally identical to other de-dogging units for a similar purpose, such as the two appearing in FIG. 6, and respectively designated 113, 114, and in FIG. 14, where it is generally designated 115 and functions also specially in the control of the convergent or re-entry zone 93. Accordingly, structural features of the initial de-dogging ramp unit 112, as best depicted in FIGS. 6A, 7 and 12 will first be detailed, on the understanding that corresponding features of the like de-doggers 113, 114 and 115 are limitedly designated by corresponding reference numerals primed, double and triple primed; and further detailed description of such features will be dispensed with.

Unit 112 is controlled by a brake type electrical motor 117 appropriately mounted at a reduction gear assembly 118 thereof on horizontal frame components 106; and the reduced speed motor output at reduction gear shaft 119 intermittently drives a generally oval, lobe-type plate cam 120 fixedly mounted to the shaft. The motor 117 is periodically energized electrically, under the control of the read-out unit 97 referred to above, to rotate precisely 180° and then be braked to a halt. This is under the control of respective "down" and "up" limit switches 121, 122 of a conventional nature, which appear in FIGS. 7A and will later be described. The limit switch arrangements for de-dogging units 112, 113, 114 and 115 are similar, and will therefore also be identified by corresponding primed numerals, without further unnecessary description.

As shown in FIGS. 6A, 7 and 12, unit 112 controls the operation of an inclined ramp 123 in the form of a pair of spaced parallel rails 124 (FIGS. 6A and 12) which overlie the respective horizontal flanges 19 of the chain and dog tracks 17, 17A; and in the mildly upwardly inclined, de-dogging position of ramp 123 appearing in FIG. 7, the de-dogging control rollers 34 of the pusher dog unit 10 will ride upwardly on the ramp rails 124, causing its two-piece pusher arm 39, 41 and roller 46 to be swung rearwardly and downwardly clockwise about the basic arm pivot axis at pin 40 from the solid line to the dot-dash line position of FIG. 2, or from its position at the right of FIG. 1 to its position at the left.

This de-dog positioning of ramp 123 is the result of a 180° rotation of the motor 117 which swings a limit switch trip arm 125 fixed on shaft 119 (FIGS. 6A and 7A) clockwise to engage and actuate the operator finger 126 of the "up" limit switch 122. When motor 117 is again energized in the same direction, on signal from the read-out sub-assembly 97, its contactor arm 125 again operates clockwise 180° to lower the ramp 123 to a substantially horizontal position, as indicated in dotted line in FIG. 7. In this setting the operating or control track rollers 34 of a dog unit 10 will not be swung sufficiently, in traversing the depressed ramp rails 124, to de-dog the pusher arm 39, 41; and accordingly the latter maintains propelling engagement with a tray unit, which thereupon will normally pass un-halted to the zone of the second de-dogging ramp unit 113 controlling pusher dog travel along the same chain power track 17A. If, however, the ramp 123 is in the elevated solid line position of FIG. 7, the pusher 10 being de-dogged, the control rollers 34 of the pusher unit will continue their travel horizontally along the rails of an elevated fixed track idler section 128 (FIG. 7) of any desired length downstream of ramp unit 112, bracket-supported above track 17 or 17A, until re-dogging is in order for restored travel along that track.

When this occurs, with reference for the moment to FIG. 2, the forward lip 77' of the reinforcing piece 77 of the tray unit 70 will, upon impact contact by pusher arm roller 46, yield forwardly a bit, as indicated in dot-dash line in FIG. 2, thus absorbing the shock and damping its noise. The lip returns to normal in an instant, maintaining a pushed contact by the pusher roller.

Further to the operation of de-dogging unit 112, it includes a pair of like guide brackets 129 of U-shaped outline in plan (FIG. 6A), which are riveted or otherwise supported upon side walls 18 of the track 17 (as are also corresponding brackets of ramp units 113, 114, 115 in reference to tracks 17 and 17A). Brackets 129 each support upright guide ways 130 between which a vertically acting slide 131 is confined, both in the plane of slide 131 and transverse of that plane, the slide being overlapped by lips of the guides 130. Ramp 123 has its track rails 124 pivotally connected to the top of the respective slides 131, as appears in FIGS. 7 and 12; and the lower ends of the slides 131 are rigidly coupled by a cross yoke 131' (FIG. 12) equipped with a follower roller 132. This roller rides the edge surface of the dogging and un-dogging plate cam 120 on motor reducer output shaft 119, so that with that cam in the solid line position of FIG. 7 its rise or swell elevates slide 131 to position the ramp 123 in its raised de-dogging position. As then rotated 180° by motor 117 under the control of the limit switch means 121 and 122, ramp 123 is dropped to the dotted line operative, dog-maintaining position of FIG. 7.

As viewed in FIG. 6, the continuation of branch power chain track 17A past the zone 91 of the primary ramp unit 112 lies adjacent the second de-dogger 113 of the same track, which is powered by a second brake-type motor 117' equipped with a conventional gear head 118'. That motor periodically operates directional limit switches 121' and 122' which are wired in series in respective phase with the corresponding limit switches 121, 122 of primary de-dogging unit 112. Having passed ramp unit 113, the branch chain track 17A merges into the arcuate diverging or exit track section 17B, by which its chain 50A is guided to push diverted tray units 24 to a service branch destination. This may be a so-called "vertical" or auxiliary floor-to-floor elevator unit of a known type which will function entirely independently of the present systems conveyor and control structure, both upon release of trays 28 from and return of the trays to chain pusher dogs. Transference of trays to and from such auxiliary system (or its general equivalent) may well be, for example, by means of belt conveyor means of the type suggested in dot-dash line in FIG. 13, but such known auxiliary arrangement constitutes no part of the present invention.

To resume, as also shown in FIG. 6, the main power track 17 and chain 50 continue in rectilinear fashion on the downstream side of the third de-dogging ramp unit 114, located adjacent track 17 and directly transverse of unit 112. Intermittent operation of the brake type motor 117'' of ramp unit 114, as timed by its limit switches 121'' and 122'' is in 180° opposite phase to the operation of the motors 117, 117' which cam-operate the de-dogging ramp units 112, 113, respectively. That is, under signal from the read-out unit 97, and assuming that units 112, 113 are de-doggingly operated "up", then main power track de-dogging unit 114 will be operated "down", and vice versa; and the reversed arrangement of the pairs of limit switches 121', 122' and 121'', 122'', as depicted in FIGS. 6 and 15, so indicates.

Thus, while branch ramp units 112, 113 operate in phase, there is no possibility that two pusher dog units 10 traversing main and branch power tracks 17, 17A will simultaneously be ramped up or, conversely, simultaneously ramped down; nor can a later-described ganged mechanical diverter switch go except to its switching position if ramp units 112, 113 are "down" and ramp unit 114 is "up". The provision of the two series-energized branch track ramp units 112, 113 provides a fail-safe factor in the event that one or the other thereof may become partially incapacitated.

FIGS. 6 and 9 illustrate a type of dual photo-switch reflective control unit, generally designated 133, which is associated with, and as an important sub-assembly of, the present system, being located at a zone just to the left or downstream (FIG. 6) of the de-dogging units 113, 114. Specific details and the operation thereof are not part of the invention, since the components are purchased ones; it suffices to state that this subassembly comprises a pair of like light beam-emissive lamp and sensor units 134, 135 bracket-mounted to opposite longitudinal angle pieces 106 of the machine frame. Units 134, 135 originate beams 136, 137, respectively, which are lined up to impinge opposite sides of a fixed reflector 138 located mid-way between the tracks 17 and 17A. As wired electrically with the circuitry of the system (per FIG. 16), the photo-cells or "electric eyes" of units 134, 135 function importantly in the system control, in electrical response to the interruption of a beam 136 or 137 by a traveling pusher dog unit 10, as will later be described with reference to FIG. 16.

Diversion of tray units 24 in response to signals read off at unit 97, and forwarded in coordinated fashion by the motorized ramp units 112, 113, 114, is under the mechanical control of a dual arm, motor-powered diversion switch assembly at zone 90, as shown in FIGS. 6, 10 and 11, said assembly being generally designated by the reference numeral 140. It comprises a first elongated diverter arm 141 of mildly arcuate outline as viewed in plan, and a second, somewhat shorter and straight arm 142 substantially paralleling the arm 141, but spaced across arcuate track reach 17B from the latter arm.

An electric reversing motor 143 equipped with a speed reduction gear unit 144 is fixedly mounted by a U-shaped upright bracket 145 on a longitudinal side frame member 106; and an operating crank arm 146 is fixed on the output shaft 144' of reducer 144. The end of arm 146 is pivotally connected to one end of a top connector link 147, which in turn is pivotally connected at its opposite end to a small side bracket 147' fixedly carried by the adjacent arcuate diverter arm 141 of switch unit 140.

Said arm 141, as indicated best in FIG. 11, comprises a pair of vertically spaced, rigidly connected switch arm components 141' which are fixedly connected to an upright switch operating shaft 148 adjacent the top of the latter, as by a connected bracing sleeve 150 pinned or otherwise fixedly connected to the shaft. Shaft 148 is housed in an upright frame-supported casing 149, and the switch arm components 141' are preferably top edge-capped with plastic anti-friction strips 151.

Similarly, the other and straighter diversion switch arm 142 is mounted to a second upright shaft 152, its parallel arm components 153 being fast on a bracing sleeve 154 pinned or otherwise fixedly connected to shaft 152 adjacent the top of the latter. Arm elements 142 also are preferably equipped with anti-friction plastic strips 155 (FIG. 6). Shafts 148, 152 are appropriately journalled on the frame structure, as by upper and lower bearing components 156, 157, the former serving as vertical bearing supports for the respective switch arm bracing sleeves 150, 154 and being themselves sustained vertically by special angle bracket parts 158 of the frame structure.

Shaft 148 of diversion switch arm 141 has an operating crank 160 secured thereto adjacent its bottom end; and a clevis 161 is pivotally connected to said crank. The clevis is carried by one end of an elongated adjustable turnbuckle-type connector 162, which at its opposite end connects to a second clevis 163 (FIG. 6) pivoted on a second crank 164. That crank is fast on the bottom end of the upright operating shaft 152 of the straight diversion control arm unit 142. Thus, the diversion switch arms 141, 142 are mechanically gang-coupled by their respective crank arms 160, 164 and the coupling clevis-turnbuckle connection for simultaneous movement between the solid and dotted line positions thereof (FIG. 6), in the former of which they confine the path of tray units 24 to an arcuate one along which pusher dogs traveling the straight branch pusher dog track 17A diverge onto an arcuate branch extension 17B of that track. The trays 24 have a straight-through, undiverted travel path as propelled by the main power chain 50 travelling the main conveyor track 17, when the ganged unit 140 of switches 141, 142 is in the dotted line position indicated in FIG. 6. As traveling the diverted path, the tray units 24 slide on arcuate extensions 21' of the branch track ways 21, the left-hand of which (FIG. 6) is actually a separate slide support fixedly mounted to the frame structure downstream of the de-dogging ramp units 113, 114; and the trays are then confined between upright arcuate side guides 110' as extensions of the corresponding straight upstream side guides 110.

FIG. 6 also shows the diversion switch arms 141, 142 in swinging through a limited distance between their solid line and dotted line positions, and vice versa, as operating limit switches 166 (out) and 167 (home). This happens when the arms arrive at the respective diverting and straight-through positions, and the effect is to terminate energization of the switching motor 143, the latter being braked to a halt; the switches 166, 167 being of the spring biased, normally closed type and being wired into the electrical circuitry of the installation as shown in FIG. 16 and later described.

If desired, an appropriate fixed de-dogging ramp unit 168, similar to the cam arrangement 27 of FIGS. 2 and 3, may be associated with the main power track downstream of the other motorized de-dogging ramp units, the presence or absence of unit 168, however, not being germane to the invention.

Referring to FIG. 6B, in conjunction with FIG. 13, it has been mentioned that the branch power chain track 17A includes a portion at 95 along which it rises from a lower level (FIG. 13), in which its power chain 50A is driven around the sprocket 96. Thus, as dogs 10, under chain propulsion through track 17A, travel away from the sprocket 96 and up the track rise 95 toward read-out unit 97 (direction X in FIG. 6B) it is intended that they be automatically set in lowered, de-dogging position. This is pending the placement of a tray 24 at or upstream of reader 97, a position to which the tray may be delivered from a "vertical", for example, by an independent belt-type conveyor.

FIG. 13 schematically illustrates a typical such return-to-tray arrangement, in which the upward rise portion 95 of track 17A merges to the left and up to the normal horizontal elevated level of said track. FIG. 13 also shows, incidentally, in dot-dash line, an auxiliary powered V-belt reach or parallel reaches 171 trained about a pulley or pulleys 172, upon which tray units 24 may be returned to power chain dog propulsion traveling in the direction of the arrow Y in FIG. 13, as from the elevator system.

For the intended purpose, the rise 95 of track 17A is equipped, in a zone rearwardly of its top, with an arcuate fixed automatic de-dogging ramp structure 173, onto the rails of which the control dog rollers 34 of the power chain will ride, being thus cammed to the de-dogging condition by ramp 173. The latter is fixedly mounted to side walls of track 17A by bracket means 174. Departing the left-hand end of ramps 173, the pusher dogs will resume their normal elevated operating position for drivingly engaging a tray unit 24 which has been advanced in a properly timed order along the belt conveyor means 17A, or otherwise placed at or to approach the zone of reader unit 97.

FIG. 14 illustrates a typical convergent or re-entry track and mechanical switch arm control zone 92 of the system, through which the branch line power chain track 17A, traveling in the direction of the arrow in FIG. 14, resumes a parallel relationship with an arcuate portion 17C of the main pusher chain track 17 or, conversely although not shown, converges arcuately into parallelism with a straight portion of the main track. The structure of the convergent or re-entry zone 93 includes, in addition to the fourth de-dogging ramp unit 115 previously mentioned, a mechanical switch arm device 177 pivotally mounted at its rear or abovestream end (as is the diverging switch arm unit 140) by means of an upright, appropriately journalled shaft 178 having an upper bearing in a frame-mounted bracket 179.

The arrangements are similar to those previously described in reference to the ganged switch arm unit 140, hence are not specifically detailed. Shaft 178 fixedly carries a crank 180 to which a connecting link 181 is pivoted; and the opposite end of link 181 is pivoted to an operating crank 182 of a braked electrical motor 184. This is substantially the same connection as the operating linkage for switch unit 140; and switch member 177 has a limited arc reversing swing between its solid and dotted line positions of FIG. 14. In the latter of these it blocks the path of travel of trays traveling branch track 17A, opening the path of trays traversing main power chain track 17. In its solid line position, switch member 177 opens to permit travel of trays on the branch track in resuming parallelism with main track 17. In this type of operation, the unit 115 serves as a protective de-dogger ramp unit, disabling pushers traveling track 17 in the event there is, under proper signal control, a pusher intended to round the arcuate reach portion 17C of the branch power track. As indicated above, the unit 115 is substantially identical in structure and mode of operation to the previously detailed unit 112, hence needs no further description. The fixed ramp extension rails upon which the control rollers 34 may travel, in the de-dogged condition thereof, are designated 187.

In the typical operation of the system as instanced at the tray deflector or exit zones 90, 91 of FIGS. 6 and 6A, also as more schematically depicted in FIG. 15 and under the control of electrical components and circuitry appearing in FIG. 16, let it be assumed that no tray or tray unit 24 is as yet or at a given instant under propulsion by the main line power chain 50 or the branch or diversion line chain 50A. It will further be assumed that deflector switch arms 141,142 are set for "through" traffic, (dotted line position in FIG. 6). Under these conditions, further, the de-dogger ramp unit 13 alone has its motor 118' braked in the up (de-dogging) position of its ramp 123', and, reference now being in the main to FIG. 16, the limit switches 122 (down), 122" (down), 121'(up) and normally open limit switch 167 (home) are actuated.

Now tray 24 intended to be bound in the direction of diverging or branch track 17B (FIGS. 6 and 15) goes over the reader strips 101 of unit 97, a portion of which energizes a first control relay CR-1. The latter in turn energizes, through the normally closed limit switch 166 (out), its relay contacts CR-1a, CR-1b and limit switch (up), the motor 118 of ramp unit 112, thus raising the ramp 123 first downstream of the reader 97 to the de-dogging position shown in solid line in FIG. 7. A main line power chain dog, in breaking the beam 137 of the photoelectric eye unit 135 following the energizing of relay CR-1, causes another relay CR-6 to be energized to latch, in a circuit including a third contact CR-1c of relay CR-1. Relay CR-6 then energizes motor 118", through relay contact CR-6a and limit switch 121" (up), thus raising the ramp 123" of de-dogger unit 14 on main power chain track 17 to de-dogging position. Also, when said first, branch line-destined, dog (again following energizing of relay CR-1) breaks the beam 136 of the second photoelectric device 134, another relay CR-7 is energized to unlatch through a contact CR-1d of relay CR-1. Contact CR-7a of relay CR-7 and closed limit switch 122' (down) now energize the motor 118' of the branch track ramp unit 113 second-downstream of reader 97, lowering the unit's ramp 123' in relation to branch chain track 17A. According, with de-dogger 114 in the de-dogging "up" position and de-dogger 113 in "down" condition, the respective limit switches 121" (up) and 122" (down) are actuated, completing the circuit through relay contacts CR-1e and CR-6b to energize the diverter or tray deflector motor 143 to the solid line operative switching position of its arms 141, 142 as shown in FIG. 6.

This is on the assumption that a reader-originated "divert" signal has been initiated through a relay (not shown) at the reader 97 to close that relay's divert contact CR-RD, as wired in parallel with contact CR-1a. The same is also true of the corresponding contact CR-RT, as paralleled with relay contact CR-2a and closed by energization of another relay (not shown) at the reader 97.

When deflector arms 141, 142 are in the deflecting position, the normally closed limit switch 166 (out) is opened, releasing relay CR-1. The latter is re-energized duly in an instantaneously later phase to again energize the ramp motor 118 of unit 112, this through a circuit including series-connected relay contacts CR-1g and CR-2f. As a result the de-dogger ramp 123 located first downstream of the reader is lowered, allowing the tray 24, as powered by a dog unit on branch or diverter line chain 50A, to proceed on through the earlier-lowered de-dogger unit 113 downstream of unit 112.

If a following tray 24 is also routed by read-out unit 97 for travel in the diverging direction, relay CR-1 is not energized, despite the fact that that tray's destination has been read at the reader to close relay contact CR-RD, because limit switch 166 (out) is held open. Thus said following tray is not stopped and no motors are energized.

If, however, said following tray is to go straight through on chain track 17 then a "through" signal from the reader 97 energizes relay CR-2. Relay CR-2 now energizes motor 117 of de-dogger 112, the circuit including relay contact CR-2a, CR-2b and limit switch 121 (up), raising the ramp of unit 112 to the de-dogging position. When a first dog (following energizing of relay CR-2) breaks the beam 137 of the electric eye unit 135, relay CR-6' is energized to unlatch through contact CR-2g its relay contact CR-6'a and limit switch 122" (down). Thus relay CR-6' energizes motor 117" through contact CR-6'a and limit switch 122" (down), which lowers the de-dogger ramp 123" of unit 114 on main or through track 17. Also, when the first main track pusher dog (following energizing of relay CR-2) breaks the beam 136 of electric eye 134, the relay CR-7' is energized to latch through closed contact CR-2d of relay CR-2. Relay CR-7' energizes motor 117' through its contact CR-7'a and limit switch 121' (up), which raises the ramp 123' of the second-downstream branch track unit 113 to the de-dogging position. When de-dogger motor 117' is rotated "up" and de-dogger motor 117" is "down", then the respective limit switches 121' (up) and 122" (down) are closed, completing a circuit through these switches and relay contacts CR-2 to energize the diverter or deflector switch motor 143. When its switch unit 140 is in the non-deflecting (home) position, shown in dotted line in FIG. 6, limit switch 167 (home) is actuated to open position, releasing relay CR-2. The latter again, through its contact CR-1g and contact CR-2f of relay CR-2, again energizes ramp motor 117, which lowers the de-dogger ramp 123 and allows the tray 24 to go through on the straight line continuation of main track 17.

If a following tray is also reader-commanded in the straight line direction, relay CR-2 will not energize on the "through" signal from the reader at contact CR-RT, because limit switch 167 (home) is actuated and open.

Each time a relay CR-1 or CR-2 is energized and a tray 24 actuates a "check" limit switch, located upstream of de-dogger unit 112 and designated 190 in FIG. 15, a relay CR-4 is energized, respectively closing and opening the ganged contacts 191 and 192 (FIG. 16) of check switch 190. Thus, in the event that branch track de-dogger 112 did not operate properly and a tray went past the check switch unit 190 while relay CR-4 is energized, the latter's circuit will include a closed contact CR-1f or CR-2e, so that another relay CR-5 is energized through its contact CR-4a. This establishes a holding contact CR-5a, and opens a contact CR-5b in a circuit to power terminals T to halt the drive of both power and branch pusher dog chains 50, 50A. It also causes a buzzer alarm 195 to be sounded on energization through relay contact CR-5c. A master re-set switch 194 is wired in series with relay CR-5.

What is claimed is:

1. A conveyor apparatus of the type comprising an elongated track that defines a path along which load carriers can move in a first zone, an elongated driving element extending along said track in a second zone and which is normally power driven lengthwise in a forward direction, and a propelling unit comprising a body constrained to move with the driving element in said second zone and a pusher member and a sensing member carried on said body for movement relative thereto, said pusher member being biased to an operative position in which a part on it projects into said first zone to be engageable with a load carrier and constrain the same to move with the driving element, and the sensing member normally being in a position in which a portion thereof projects into the first zone to be engageable with an overtaken load carrier and to be moved by such engagement and thereby effect movement of the pusher member away from its operative position, said apparatus being characterized by:

A. means providing a toggle connection between the pusher member and the body by which the pusher member is releasably locked in its operative position, said toggle connection means being located wholly in said second zone and comprising at least one link having a pivotal connection with the body and having a motion transmitting connection with the pusher member by which swinging motion of said link in one direction imparts motion to the pusher member in the direction away from its operative position;

B. means providing a first motion transmitting connection, between the sensing member and said link, whereby motion of the sensing member away from its said position imparts to the link swinging motion in said one direction;

C. cam follower means constrained to movement on the body in opposite directions toward and from said first zone but confined to said second zone, said cam follower means being cooperable with cam means located adjacent to the driving element and in said second zone; and D. means providing a second motion transmitting connection, between said cam follower means and said link, whereby movement of the cam follower means in one of its said directions imparts motion to said link in its said one direction.

2. The apparatus of claim 1 wherein the pusher member comprises a lever medially pivoted on the body, one arm of said pusher member comprising said part thereof, further characterized by:

said toggle connection means further comprising a second link having near one of its ends a pivotal connection with the first mentioned link and having near its other end a pivotal connection with the other arm of the pusher member, said links being normally disposed forwardly of the pivot axis of the pusher member, so that swinging motion of the pusher member to carry said part thereon out of said first zone concurrently imparts a component of rearward motion to said part.

3. The apparatus of claim 2, further characterized by:

1. said sensing member also being a lever medially pivoted on the body, the pivot axis of the sensing member being parallel to and forwardly of that of the pusher member, one arm of the sensing member comprising said portion thereof which projects forwardly into the first zone; and 2. said first motion transmitting connection means comprising a third link connected between the other arm of the sensing lever and a portion of the first mentioned link that is spaced from its pivotal connection to the body.

4. A conveyor apparatus of the type comprising an elongated track upon which load carriers are guided for travel therealong, an elongated driving element at a level beneath the track and extending therealong, said driving element being normally power driven lengthwise in a forward direction, and a propelling unit comprising a body beneath the track which is constrained to move with the driving element and which has movable thereon a pusher member and a sensing member, the pusher member being normally in an operative position to which it is biased and at which a part thereon projects above the track to be engageable with a load carrier for constraining the same to move with the driving element, and the sensing member having a portion which normally projects above the track for engagement with any obstruction thereon, such as an overtaken load carrier, said sensing member being moved in consequence of relative forward motion of the propelling unit during such engagement and by its movement effecting motion of the pusher member out of its normal position, said apparatus being characterized by:

A. the pusher member comprising a lever pivoted on the body for swinging motion about a substantially horizontal axis transverse to the track;

B. toggle means comprising at least one link having one end pivotally connected with the body and having at its other end a connection with the pusher member whereby the pusher member can be releasably locked in its operative position and is moved therefrom in consequence of swinging motion of said link;

C. means providing a motion transmitting connection between the sensing member and said link whereby movement of the sensing member out of its said position imparts swinging movement to said link;

D. cam follower means movably carried by the body and confined to generally vertical motion relative thereto between defined limits, at both of which the cam follower means is located wholly below the level of the track, said cam follower means being cooperable with ramp means adjacent to the driving element and below said level; and E. means providing a motion transmitting connection between the cam follower means and said link whereby movement of the cam follower means from one of its limits of motion towards the other imparts motion to the pusher member away from its operative position.

5. The apparatus of claim 4, further characterized by: said part on the pusher member being so located and arranged in relation to the pivot axis of the pusher member as to swing obliquely rearwardly and downwardly as the pusher member moves away from its operative position.

6. The apparatus of claim 5, further characterized by: said part being mounted on the pusher member for swinging motion relative thereto forwardly and downwardly away from a defined load carrier engaging position and being biased to swing towards said position, such swinging of said part against its bias enabling a load carrier which travels forwardly relative to the propelling unit to pass the latter without interference from the pusher member even though the pusher member is in its operative position.

7. The apparatus of claim 4, further characterized by:

F. the sensing member comprising a lever mounted on the body for swinging motion about a pivot axis substantially parallel to the axis about which the pusher member swings and spaced forwardly from said axis; and G. the sensing member having an arm which projects obliquely forwardly and upwardly from its pivot axis and on which there is an upper load carrier engaging surface which is inclined forwardly and downwardly to cause said arm to be cammed downwardly by its engagement against an overtaken load carrier.

8. A conveyor apparatus of the type comprising an elongated track upon which load carriers can move, an elongated driving element extending along said track at a level beneath the same and normally power driven lengthwise in a forward direction, and a propelling unit having a body beneath said track which is constrained to move with the driving element and which carries a pusher member and a sensing member, the pusher member being movable relative to the body to and from an operative position in which a part thereof projects above the track for engagement with a load carrier to constrain the same to move with the driving element, and the sensing member having a portion which normally projects above the track and which is adapted to be moved by engagement with an overtaken load carrier and by such motion to effect retraction of the pusher member out of its operative position, said conveyor apparatus being characterized by:

A. said sensing member comprising a lever pivotally connected to the body and having an arm which projects obliquely forwardly and upwardly from the pivotal connection, said portion of the sensing member comprising an upper camming surface on said arm that is inclined forwardly and downwardly to be forced downwardly by engagement under an overtaken load carrier; and B. means providing a toggle connection between the sensing member and the pusher member whereby the pusher member is normally releasably locked in its operative position but is moved out of its operative position upon downward movement of said arm of the sensing member.

9. The apparatus of claim 8, further characterized by:

C. the pusher member comprising a lever pivoted to the body for swinging movement about an axis parallel to and behind that about which the sensing member swings and having an upper arm comprising said part of the pusher member; and D. said toggle connection being arranged to cause said upper arm of the pusher member to swing rearwardly and downwardly in consequence of downward movement of said arm of the sensing member.

10. A conveyor apparatus of the type comprising an elongated track that defines a path along which load carriers can move in a first zone, an elongated driving element extending along said track in a second zone and which is normally power driven lengthwise in a forward direction, and a propelling unit comprising a body constrained to move with the driving element in said second zone and a pusher member and a sensing member carried on said body for movement relative thereto, said pusher member being biased to an operative position in which a part on it can project into said first zone to be engageable with a load carrier and constrain the same to move with the driving element, and the sensing member having a normal position in which a portion thereof projects into the first zone forwardly of the pusher member to be engageable with an overtaken load carrier and to be moved toward the second zone by such engagement, said apparatus being characterized by:

A. means providing a connection between the pusher member and the sensing member by which the pusher member is normally confined to its operative position but by which it is moved out of its operative position upon movement of the sensing member out of its normal position so that the pusher member can not engage a load carrier overtaken by the propelling unit while the sensing member is engaged with the load carrier; and B. said part being mounted on the pusher member for swinging movement relative thereto forwardly and out of the first zone away from a defined load carrier engaging position and being biased to swing towards said position, such swinging of said part enabling a load carrier which travels forwardly relative to the propelling unit to pass the latter without interference from the pusher member even though the pusher member is in its operative position.

11. The apparatus of claim 44, further characterized by:

C. said connection means comprising (1) means providing a toggle connection between the pusher member and the body by which the pusher member is releasably locked in its operative position, and (2) means providing a motion transmitting connection between a part of said toggle connection and the sensing member whereby movement of the sensing member away from its normal position imparts to the pusher member motion away from its operative position.

12. The apparatus of claim 45, wherein said pusher member and said sensing member comprise levers mounted on the body for swinging motion about axes in said second zone that extend transversely to the track, further characterized by:
  (1) said toggle connection means being located wholly in said second zone and comprising at least one link having a pivotal connection with the body that is spaced from and parallel to the axis about which the pusher member swings, and having a connection with the pusher member by which swinging motion of said link in one direction swings the pusher member away from its operative position, and
  (2) said motion transmitting connection comprising a connection between the sensing member and said link whereby motion of the sensing member away from its normal position imparts to the link swinging motion in said one direction.

13. The apparatus of claim 46, further characterized by:
  (1) cam follower means constrained to movement on the body in opposite directions toward and from the first zone but confined to said second zone, said cam follower means being cooperable with cam means located adjacent to the driving element and in said second zone, and
  (2) means providing a second motion transmitting connection, between said cam follower means and said link, whereby movement of the cam follower means in one of its said directions imparts motion to said link in its said one direction.

* * * * *

UNITED STATES PATENT OFFICE
CERTIFICATE OF CORRECTION

Patent No. 3,799,327            Dated March 26, 1974

Inventor(s) Schulz, Floyd R.

It is certified that error appears in the above-identified patent and that said Letters Patent are hereby corrected as shown below:

Column 4, line 30: The word "a" should be deleted

Column 14, line 53: "92" should read --93--

Column 16, line 29: "rounted" should read --routed--

Column 20, line 59: (Claim 11) "44" should read --10--

Column 21, line 5: (Claim 12) "45" should read --11--

Column 22, line 5: (Claim 13) "46" should read --12--

Signed and sealed this 1st day of April 1975.

(SEAL)
Attest:

RUTH C. MASON
Attesting Officer

C. MARSHALL DANN
Commissioner of Patents
and Trademarks